March 16, 1937. B. J. POWELL 2,073,851
HUB CAP LOCK
Filed March 14, 1932
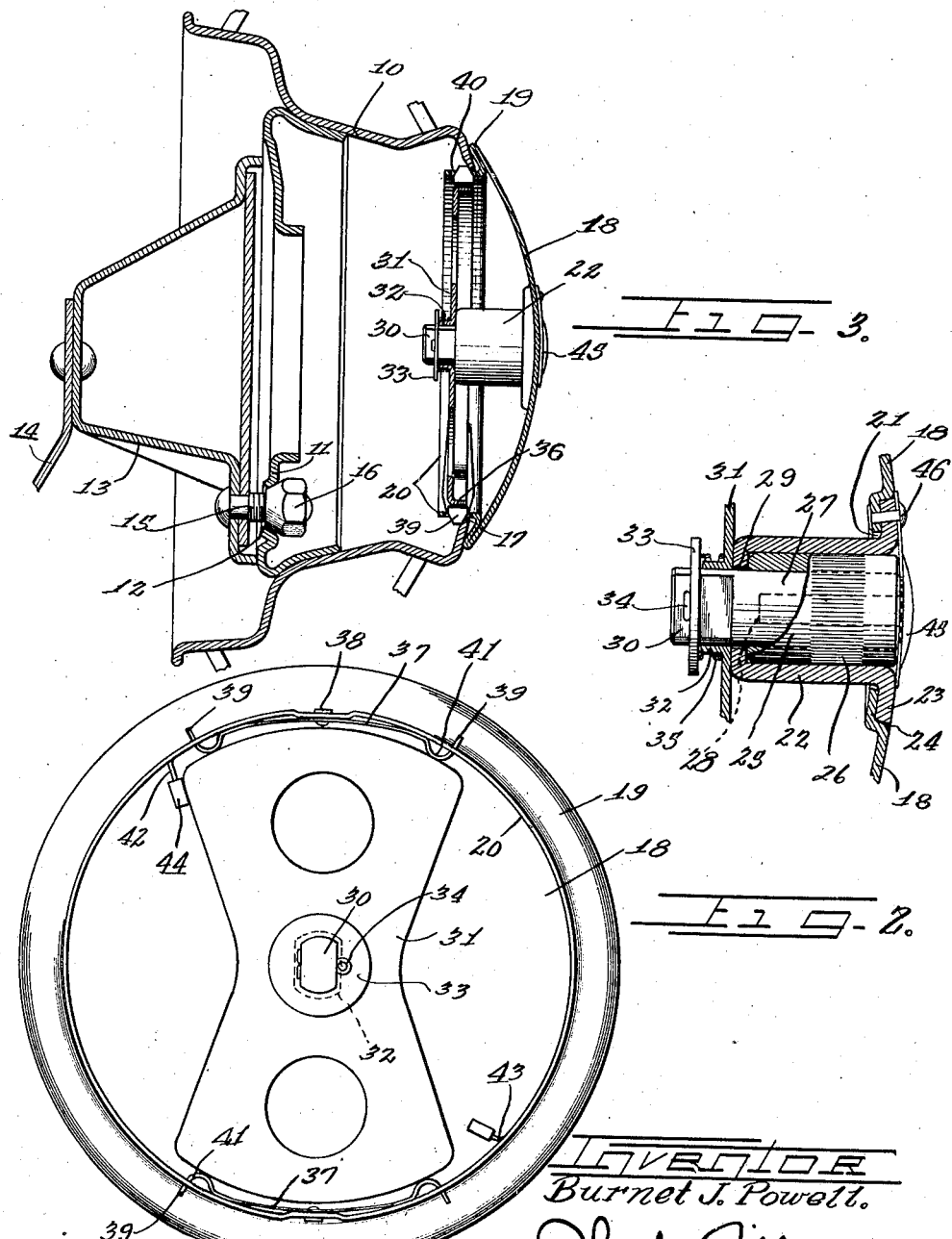
Inventor
Burnet J. Powell.

Patented Mar. 16, 1937

2,073,851

UNITED STATES PATENT OFFICE 2,073,851

HUB CAP LOCK

Burnet J. Powell, North Chicago, Ill., assignor, by mesne assignments, to Lyon Cover Company, Detroit, Mich., a corporation of Michigan Application March 14, 1932, Serial No. 598,556

15 Claims. (Cl. 70—167)

My invention relates to the locking of hub caps to the hubs of automotive vehicles, the invention being particularly adaptable and useful where the bolts for supporting the wheel either on the vehicle for service or on a spare wheel carrier are located within the hub so that the hub cap must be removed in order to get access to the bolts.

The object of the invention is to provide improved and simplified means for readily and efficiently locking the cap to the hub.

On the accompanying drawing,

Figure 1 is a cross-sectional view of a wheel hub and cap thereon and part of a spare wheel carrier structure;

Figure 2 is an enlarged inside view of the cap structure; and

Figure 3 is an enlarged fragmentary sectional view of the cap structure showing the mounting and control of the locking element.

The wheel structure shown comprises the hub body 10 formed of sheet metal, with the transversely extending bolt flange 11 within the body and provided with bolt holes 12 for receiving the bolts which secure the wheel to the vehicle for service or on a spare wheel carrier. I have shown the hub mounted on a carrier structure comprising the body 13 and supporting means therefor such as a bracket 14. Threaded studs 15 extend from the carrier body for registration with holes 12 in the bolt flange of the wheel hub, one or more nuts 16 being applied to the studs 15 for holding the wheel to the carrier.

In its front wall the hub body has the cylindrical opening 17 through which access may be had by suitable tools for application or withdrawal of the nuts 16 which secure the wheel either to the vehicle for service or to the spare wheel carrier. Such opening 17 is usually closed by a cap structure. The cap structure shown comprises the outwardly convex body 18 which along its outer edge is bent and deflected to form the abutment perimeter 19 and the cylindrical flange 20, the flange being of a diameter to extend through and fit in the opening 17 and the perimeter 19 abutting against the outer wall of the hub around the opening 17.

The cap body has the axial opening 21 therethrough for the insertion of a lock housing 22 which has the outer flange 23 for engaging in the recess 24 formed by deflecting the cap body inwardly, the flange being rigidly secured to the cap body as by means of spot welding.

Secured within the housing 22 is a lock cylinder 25. As shown, the cylinder has serrations 26 on its outer surface which enter into frictional engagement with the walls of the housing when the cylinder is forced thereinto and the cylinder will thereby be rigidly held in the housing. The lock cylinder journals a lock barrel 27 which may be locked to or unlocked from the lock cylinder by means of suitable tumblers (not shown) controlled by the insertion of the proper key in the keyhole 28 in the barrel. The lock barrel extends through the opening 29 formed in the bottom wall of the housing 22, the outer end of the barrel being of polygonal cross-section which may be formed by slabbing off opposite sides of the barrel end. The polygonal end 30 receives and supports a cam member 31 which, as shown is in the form of an oblong plate of sheet metal having an opening for receiving the polygonal end and having the flange 32 surrounding the opening for intimate engagement with the polygonal end 30. Outside of the hub flange 32 the polygonal end 30 receives a washer 33 which is held in place as by means of a cotter pin 34, a spring 35 being preferably inserted between the washer and the body of the member 31 so as to hold said member in bearing engagement with the rear end of the lock housing 22. When a key is inserted in the lock barrel, the lock barrel will be unlocked from the housing 22 and may then be turned by the key, and such turning will cause rotational movement of the cam member 31.

The outer ends of the cam member 31 are deflected laterally to form cam flanges 36 which, as shown, are concentric with the axis of the member 31. At diametrically opposite sides of the cap structure flange 20 are supported the locking members 37, each of which is in the form of a comparatively long flat spring secured at its center to the flange 20 as by means of a rivet 38. At its end each spring member is deflected outwardly radially to form locking flanges or lugs whose side edges are beveled as clearly shown in Figure 1. In alignment with each spring end or lug 39 is a slot 40, these slots being cut in the flange 20 of the cap structure.

The actuating cam member 31 cooperates with the spring locking members to control the locking or unlocking positions of the flat ends 39 thereof. Referring to Figure 2, when the actuating member 31 extends horizontally its cam flanges 36 will be away from the locking members and the tension of these spring members will hold their ends radially inwardly with the latch ends 39 inside of the outer surface of the cap flange 20. When the actuating member 31 is rotated to extend vertically as shown in Figure 2, the cam flanges 36 will engage with the free ends of the spring locking members and force the latching ends 39 thereof outwardly through the slots 40 in the flange 20, and when the cap structure is applied to the hub, these ends 39 will engage against the inner side of the hub body wall around the opening 17 through which the flange 20 is extended. Preferably the ends of the spring locking members are deflected inwardly to form contacts 41 for engagement by the flanges 36 on the actuating member 31. To stop further movement of the actuating member after it has been rotated to locking position or unlocking position relative to the spring locking members, stops 42 and 43 are provided and these stops may be formed by deflecting sections of the metal of the flange 20 inwardly. To prevent impact noise these stops may be provided with sleeves 44 of cushioning material such as rubber.

Figure 1 shows the cap structure locked to the hub. When the cap is thus locked in place, access to the wheel supporting nuts or bolts will be shut off and theft of the wheel will be prevented whether the wheel is in service on the vehicle or is secured to the carrier structure. If it is desired to remove a cap the proper key is inserted in the key hole of the lock barrel 27 and the barrel is then turned to swing the actuating member 31 away from the stop 42 and away from the ends of the spring locking members, further rotation of the member 31 in this direction being prevented by the engagement thereof with the stop 43. Upon such rotation of the member 31, the release spring locking members will withdraw their latch ends 39 sufficiently so that the cap structure may be removed through the opening 17 in the hub. When the cap is to be reapplied to the hub, it is inserted through the opening 17 and the key is then turned to cause swing of the actuating member 31 into engagement with the stop 42, the cam engagement of the members with the spring locking members then forcing the latch ends 39 outwardly behind the front wall of the hub body surrounding the opening 17 and the beveled edges of the latch ends 39 will have more or less wedging engagement with the hub wall and will hold the cap with its perimeter 19 securely abutting against the outer wall of the hub.

To conceal the lock cylinder 27 and cover the lock barrel and key hole against the weather, a cap 45 may be provided and pivoted at one end to the flange 23 of the housing 22 by means of a rivet 46 so that when it is desired to insert the key the cap may be readily swung to one side.

I have shown a practical and efficient embodiment of the various features of my invention but I do not desire to be limited to the exact construction, arrangement and operation shown and described as changes and modifications may readily be made without departing from the scope of the invention as outlined by the appended claims.

I claim as follows:

1. The combination with the hub of an automotive vehicle wheel having an opening in its front wall, of a closure cap for said opening having a flange for projecting through said opening, spring latch members mounted on said flange and having latch ends, said latch members normally holding their latch ends inwardly behind the outer surface of said flange, an actuating member rotatably mounted on said cap for engagement with said latch members to project their latch ends outwardly from said flange and into interlocking engagement with the hub wall surrounding the flange receiving opening, and means for locking said actuating member against rotation after projection thereby of said latch ends, whereby to lock said cap to said hub.

2. The combination with the hub of an automotive vehicle wheel having an opening for access of tools for securing the wheel, of a closure cap for said opening having a flange for extending inwardly through said opening when the cap is applied in closing position, said flange having slots, latch members supported on said flange and having latch ends adapted to be projected through said slots into interlocking engagement with the hub wall surrounding the flange receiving opening, spring means tending to hold said latch ends in unlocking position, an actuating member mounted on said cap to be moved to force the latch ends against said spring means and through said slots for interlocking engagement with the hub wall to thereby lock the cap to the hub, and means for locking said actuating member.

3. The combination with the hub of an automotive vehicle wheel having an access opening for tools for securing the wheel to a support, of a closure cap for said opening, said cap having a flange for extending through said opening into the hub and being provided with slots, spring locking members mounted on said flange and having latched ends in register with said slots, the spring action of said locking members normally holding the latch ends withdrawn from said slots, a rotary member on said cap, and an actuating member rotatable with said rotary member to engage said spring locking members to project their latch ends through said slots into interlocking engagement with the hub wall to thereby lock the cap to the hub.

4. The combination with the hub of an automotive vehicle wheel having an access opening for tools for securing the wheel to a support, of a closure cap for said opening having a flange thereon for extending through said opening and being provided with slots, spring locking members secured to said flange and having latch ends in register with said slots, the spring action of said locking members normally withholding the latch ends from said slots, a housing on said cap, a lock cylinder secured in said housing, a key controlled lock barrel in said lock cylinder, and an actuating member mounted on said lock barrel to rotate therewith and having engaging surfaces for engaging said spring locking members to project their latch ends through said slots and into locking engagement with the wall of said hub thereby to lock the cap to the hub.

5. A hub cap for automotive vehicle wheels having an annular flange extending therefrom for projection through the hub opening to be covered, circumferentially extending spring lock members mounted on said flange, a housing extending inwardly from the central part of the cap, a lock cylinder in said housing having a key operable lock barrel, and an actuating member connected with the inner end of said lock barrel to rotate therewith, said actuating member having surfaces for cooperating with said lock members to move them into interlocking engagement with the hub wall to thereby lock the cap thereto.

6. The combination with the hub of an automobile wheel having an opening in its front wall, of a closure cap for said opening having a flange for projecting through said opening, latch members on said flange and means for holding said members normally within the outer surface of said flange, an actuating member rotatably mounted on said cap and extending radially, and key controlled means for rotating said actuating member into engagement with said latch members to shift them radially into interlocking engagement with the hub wall surrounding said flange receiving opening.

7. The combination with the hub of an automobile wheel having an opening in its front wall, of a closure cap for said opening having a flange for projecting through said opening, latch members on said flange and means for normally holding said latch members within the outer surface of said flange, a lock cylinder supported axially on said cap and having a key operable lock barrel therein, and a disc supported on the inner end of said lock barrel and having a surface for engaging with said latch members when said lock barrel is turned to cause radial movement of said latch members into interlocking engagement with the hub walls surrounding the flange receiving opening.

8. The combination with the hub of an automobile wheel having an opening in its front wall, of a closure cap for said opening having a flange for projecting through said opening, latch members on said flange and means for yieldably holding said members normally in inner position to permit projection of said flange through said opening, an actuating member rotatably mounted on said cap and extending radially, and key-controlled means for rotating said actuating member into engagement with said latch members to shift them outwardly into interlocking engagement with the hub wall surrounding said flange receiving opening.

9. In combination, a wheel hub having an opening, a hub cap having a flange for extending through said opening, radially shiftable lock members supported on said cap and said cap flange having guide passageways for the ends of said locking members, yielding means tending normally to hold said lock members in unlocking position in said guide passageways to thereby permit extension of said flange through said opening, an actuating member adapted upon rotational movement to cause radial outward shift of said locking members to locking position, the outer ends of said locking members when in locking position being projected behind the hub wall surrounding the hub opening whereby to lock the cap to the hub, and key-controlled means for locking said actuating member after rotation thereof to shift said locking members to locking position.

10. In combination, a wheel hub having an opening, a hub cap having a flange for extending through said opening, radially shiftable lock members supported on said cap and said cap flange having guide passageways for the ends of said locking members, yielding means tending to normally hold said locking members in unlocking position in said guide passageways to thereby permit extension of said flange through said opening, an actuating member adapted upon rotational movement to cause radial outward shift of said locking members to locking position, the outer ends of said locking members when in locking position being projected behind the hub walls surrounding the hub opening whereby to lock the cap to the hub, a housing supported by said cap, a rotatable member journaled in said housing and connected with said actuating member, and means for locking said rotational member against rotation after actuation thereby of said actuating member to shift said locking members to locking position.

11. In combination with a cover cap having a disk-like body and an annular flange near the periphery of said body together with a radially movable spring latch mounted on the inner side of said flange and projecting radially therethrough to secure the cap in its operative position; a locking device comprising a relatively fixed abutment within the cap, a substantially rigid structure adapted to be interposed between the abutment and the latch to prevent radial inward movement thereof, and means to move said rigid structure into and out of operative position.

12. In combination with a cover cap having a disk-like body and an annular flange near the periphery of said body together with a radially-movable spring latch mounted on the inner side of said flange and projecting radially therethrough to secure the cap in its operative position; a locking device comprising a relatively fixed abutment within the cap, a substantially rigid structure adapted to be interposed between the abutment and the latch to prevent radial inward movement thereof, and a key-operated locking member for moving said rigid structure into and out of abutting position.

13. The combination with an automobile vehicle wheel hub having an opening, of a closure for said opening, said closure having means for projecting in the hub, said closure having latch means normally resiliently held substantially within the outer surface of the projecting means, actuating means movably carried by said closure for engagement with said latch means to project the latter into interlocking relation with the hub at said opening, and means for thereafter locking said latch means in said relation and thereby locking said closure to said hub.

14. The combination with a vehicle wheel hub having an opening for access of tools for securing the wheel, of a closure for said opening, said closure having slotted means for extending in said opening when the closure is in closing position, latch means carried by said closure and adapted to be projected through said slotted means into interlocking relation to the hub at said opening, spring means urging said latch means into unlocking position, said cap carrying actuating means movable to force said latch means against said spring means and through said slotted means into said relation to thereby hold the closure in closing position, and means for locking said actuating means.

15. The combination with a vehicle wheel hub having an opening for access of tools for securing the wheel, of a closure for said opening, said closure having slotted means for extending in said opening when the closure is in closing position, latch means carried by said closure and adapted to be projected through said slotted means into interlocking relation to the hub at said opening, spring means urging said latch means into unlocking position, said cap carrying actuating means movable to force said latch means against said spring means and through said slotted means into said relation to thereby hold the closure in closing position.

BURNET J. POWELL.